June 6, 1972  J. E. FLANNERY  3,667,973
SPONTANEOUS FLUORIDE OPAL GLASSES WITH THERMALLY
REVERSIBLE OPACITY
Filed Oct. 9, 1970

CODE 7900 GLASS SHEET

MOLTEN GLASS

INVENTOR.
James E. Flannery
BY
ATTORNEY

United States Patent Office 3,667,973
Patented June 6, 1972

3,667,973
SPONTANEOUS FLUORIDE OPAL GLASSES WITH THERMALLY REVERSIBLE OPACITY
James E. Flannery, Corning, N.Y., assignor to Corning Glass Works, Corning, N.Y.
Filed Oct. 9, 1970, Ser. No. 79,501
Int. Cl. C03c 3/04
U.S. Cl. 106—54        2 Claims

ABSTRACT OF THE DISCLOSURE

This invention relates to the manufacture of spontaneous alkali metal fluoride opal glasses containing opacity densifying agents and exhibiting thermally reversible opacity; that is, they may be heated to clearness and cooled to opacity without deformation of the glass being heated. Operative compositions include glasses consisting essentially, by weight on the oxide basis, of 70–80% $SiO_2$, 1–3% $Al_2O_3$, 7–14% $B_2O_3$, 1.5–4% $Li_2O$, 0–10% $R_2O$, wherein $R_2O$ is at least one alkali metal oxide selected from the group consisting of $K_2O$ and $Na_2O$, 3–6% F, and a total of 1–3% of an opacity densifying agent selected from the group consisting of $MoO_3$, $WO_3$, and $As_2O_3$.

BACKGROUND OF THE INVENTION

Figure 2:
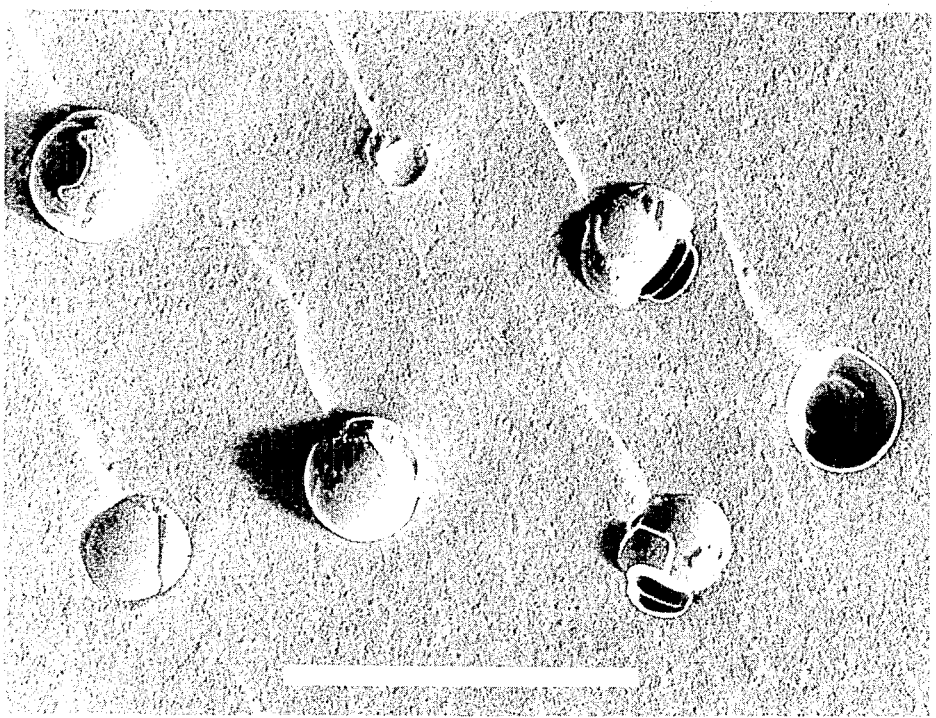

The opal glasses of the present invention are related to the spontaneous opal glasses disclosed by W. H. Dumbaugh, Jr., J. E. Flannery, and G. B. Hares in a co-pending United States patent application Serial No. 2,769, entitled Opal Glass Compositions, since both groups of glasses utilize certain opacity densifying agents. However, the glasses disclosed in that application may be distinguished from the glasses of the present invention on the ground that they are essentially calcium fluoride opals which do not exhibit thermally reversible opacity.

The term "opal glass" as used herein generally denotes a glass containing a finely-divided particulate phase dispersed in the glassy matrix, which phase has an index of refraction differing from that of the transparent glass so as to render it essentially light diffusing or opaque. This dispersed particulate phase may be either crystalline or amorphous. The degree of opacity of such opal glasses depends in part on the index of refraction of the glass and of the dispersed particulate phase. Thus, various types of opal glasses ranging from near-transparent to opaque may be produced using such commonly known opalizing agents as fluorides, sulfates, chlorides, and phosphates.

The manufacture of opal glass contemplates the inclusion in the glass batch of one of the above opalizing agents to form a compound which is soluble in the glass melt but which is phase-separable therefrom upon cooling and/or reheating the glass. The opacity of the glass is also dependent on the size, number, and distribution of the dispersed particulate phase, so that control over the degree of opalization may be effected by controlling the temperature of the glass during cooling and forming. A spontaneous opal glass is one in which the particulate light-diffusing phase readily develops upon cooling and forming the melt into a glass article so that further reheating to obtain the desired degree of opacity is not required. It will be appreciated that the elimination of any reheat treatment reduces the production cost of the finished articles, and therefore spontaneous opal glasses are normally preferred in commercial practice.

The process of opalization is generally considered to be irreversible; that is, the opacifying phase, once formed, is not readily redissolved in the matrix glass unless the glass is heated to a temperature above the softening point. For some technical and commercial applications it would be desirable to employ a glass which would be opalized or opaque under one set of conditions and transparent under other conditions.

SUMMARY OF THE INVENTION

I have now discovered an area of $B_2O_3 \cdot Al_2O_3 \cdot SiO_2$ glass composition wherein spontaneous fluoride opal glasses demonstrating thermally reversible opacity can be produced. These glasses contain, in addition to the $$B_2O_3 \cdot Al_2O_3 \cdot SiO_2$$

base glass matrix, additions of alkali metal oxides such as $Li_2O$, $Na_2O$, and $K_2O$, a fluoride opalizing agent, and at least one opacity densifying agent selected from the group consisting of $As_2O_3$, $MoO_3$, and $WO_3$. These glasses achieve a high degree of opacity when cooled from the melt as a result of the separation of a lithium fluoride, sodium fluoride, and/or potassium fluoride phase. This separated phase is in the form of droplets which crystallize on cooling, giving the glass a dense opal appearance as a result of the difference in refractive indices between the separated phases and the matrix glass.

The new and unique feature of these glasses is their unusually low opal liquidus temperature. The term "opal liquidus temperature" as used herein means that temperature at which, on cooling the melt, visible opacity first occurs. The opal liquidus of these glasses, unlike most opal glasses, is at a temperature below the softening point of the matrix glass. This property allows the glass to be reheated from room temperature to a point where all visible opacity disappears without deformation of the piece being heated, and the processes of heating to clarify and cooling to opalize may be repeated an indefinite number of times without failure of the opacity to reappear. As heretofore mentioned, the phenomenon of reversible opacity below the softening point of the matrix glass cannot occur in most conventional opal glasses because the opacifying phase must ordinarily be redissolved in the matrix glass in order for transparency to be achieved.

The exact mechanism by which thermally reversible opacity proceeds is not known, but it is believed that in these glasses the opacifying phase is in the form of encapsulated crystalline droplets of sodium fluoride, lithium fluoride, and/or potassium fluoride, possibly containing minor amounts of $B_2O_3$ as an impurity, which have a relatively low melting point, and when melted have a refractive index near that of the matrix glass. Thus, the opacifying phase does not need to redissolve in the matrix glass, but only to melt, for the glass article to become transparent.

Figure 1:
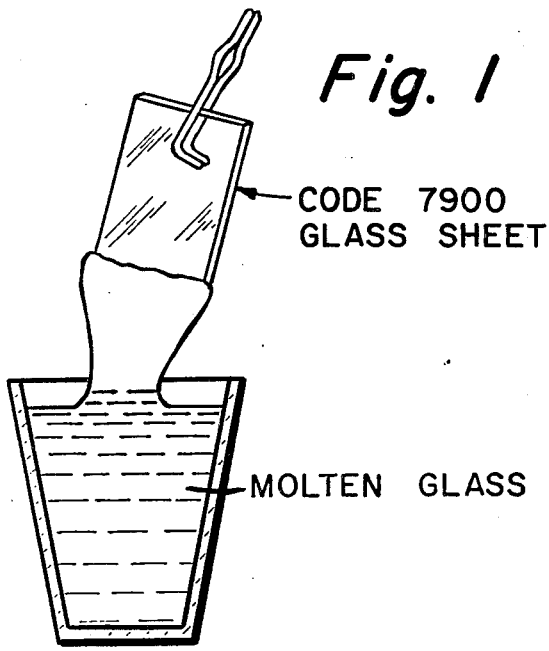

The invention may be further understood by reference to the following detailed description thereof and to the appended drawings, wherein:

FIG. 1 illustrates a quick method for drawing thin sheets of glass which was utilized as an aid in evaluating the property of thermally reversible opacity of these opal glasses; and FIG. 2 is an electron micrograph demonstrating the structure of the opal glasses made in accordance with the present invention.

DESCRIPTION OF THE PREFERRED EMBODIMENTS

Specifically, my invention comprises compositions for opal glasses exhibiting thermally reversible opacity consisting essentially, in weight percent on the oxide basis as calculated from the batch, of 70–80% $SiO_2$, 1–3% $Al_2O_3$, 7–14% $B_2O_3$, 1.5–4% $Li_2O$, 0–10% $R_2O$, wherein $R_2O$ is at least one alkali metal oxide selected from the group consisting of $K_2O$ and $Na_2O$, 3–6% F, and a total of 1–3% of at least one opacity densifying oxide selected from the group consisting of $MoO_3$, $As_2O_3$, and $WO_3$.

Although all of the glasses within the aforementioned composition ranges are spontaneous opals which will demonstrate some thermally reversible opacity, I have found that certain generalizations about the effects of composition variations on this and other physical properties of the glasses of my invention may be drawn. Hence, increasing the $Al_2O_3$ content above about 3% results in the glasses becoming seedy and viscous, while additions of the alkali metal oxides $K_2O$ and $Na_2O$ totalling more than about 10% greatly depress the viscosity of the glass. Additions of fluoride above about 6%, although effective to increase the opacity of the glass, also tend to lower the viscosity thereof below acceptable limits.

The use of the so-called opacity densifying agents $WO_3$, $MoO_3$, and $As_2O_3$ in amounts totalling at least about 1% is considered essential in achieving a spontaneous opal within the composition area where thermally reversible opals may be produced. It is believed that these oxides act to alter the surface tensions of the matrix glass and/or the opacifying phase, so as to implement the spontaneous phase separation which occurs as the glass is cooled from the melt. In any event, glasses not containing these oxides, but otherwise within the preferred range of compositions disclosed herein, exhibit markedly reduced opacity upon being drawn from the melt according to the procedure hereinafter described. Additions of these oxides totalling more than about 3%, however, do not appear to improve the depth of opacity and can result in the development of crystals of these compounds, leading to a less homogeneous-appearing opal.

Small additions of various compatible metal oxides can be tolerated, but the total of all such additions is preferably held to less than about 10% by weight. Thus, $TiO_2$, $ZrO_2$, and $P_2O_5$ may be useful in improving glassworking qualities, altering the coefficient of expansion, or providing better chemical durability to the glasses of the invention. Likewise, the conventional glass colorants, e.g., CoO, $CeO_2$, NiO, $V_2O_5$, $U_3O_8$, $Fe_2O_3$, $Cr_2O_3$, and $MnO_2$, may advantageously be included in amounts not exceeding about 3% by weight.

However, the alkaline earth metal oxides, including MgO, BaO, SrO, PbO, and ZnO, are preferably excluded from the group of compatible additives because the presence of these oxides may lead to the formation of an opacifying alkaline earth metal fluoride phase. Glasses containing such a phase are known to have an opal liquidus above their softening points; hence, they do not demonstrate useful thermally reversible opacity. Consequently, additions of the alkaline earth metal oxides totalling more than about 1% are not to be tolerated.

Table I records glass compositions, expressed in weight percent on the oxide basis, coming within the prescribed ranges of my invention. The batch ingredients may comprise any materials, either oxides or other compounds, which, on being melted together, will be converted to the desired oxide compositions in the proper proportions. In accordance with conventional glass analysis practice, the fluorine present is expressed as the entity fluoride, since it is not known with which cation it is bonded. Inasmuch as fluorine is quite readily volatilized at the melting temperatures generally employed for these glasses, viz, about 1450°–1600° C., the loss due to this factor can be as high as 50% of the amount included in the batch. This loss is obviously a function of the melting times and temperatures utilized as well as the kind of melting unit employed. It will be appreciated, therefore, that a person skilled in the glassmaking art may easily modify the initial composition of the batch to compensate for such losses and/or take special precautions to decrease volatilization, such as melting in enclosed units.

TABLE I.—GLASS COMPOSITIONS

|  | 1 | 2 | 3 | 4 | 5 | 6 | 7 |
|---|---|---|---|---|---|---|---|
| $SiO_2$ | 73.57 | 73.57 | 74.57 | 70.09 | 71.00 | 73.57 | 73.57 |
| $Al_2O_3$ | 1.86 | 1.86 | 1.86 | 1.77 | 1.71 | 1.86 | 1.86 |
| $B_2O_3$ | 12.70 | 13.70 | 12.70 | 12.26 | 12.42 | 12.70 | 12.70 |
| $Na_2O$ | 5.10 | 4.10 | 4.10 |  | 2.48 | 5.10 | 5.10 |
| $Li_2O$ | 2.00 | 2.00 | 2.00 | 1.93 | 1.95 | 2.00 | 2.00 |
| F | 4.74 | 4.74 | 4.74 | 4.57 | 4.63 | 4.74 | 4.74 |
| $MoO_3$ | 2.00 | 2.00 | 2.00 | 1.86 | 1.92 |  |  |
| $As_2O_3$ |  |  |  |  |  | 2.00 |  |
| $WO_3$ |  |  |  |  |  |  | 2.00 |

The glasses recited in Table I utilized the following batch ingredients in the proper proportions to yield the compositions therein recited:

Sand
$Al_2O_3$
$H_3BO_3$
$Li_2CO_3$
$Na_2SiF_6$
$K_2SiF_6$
$Na_2CO_3$
$K_2CO_3$
$MoO_3$ The batch materials were melted in an electrically-fired furnace for four hours at 1550° C. in covered platinum crucibles. Shapes of glass were then drawn from these melts in the manner shown in FIG. 1. According to that method a piece of Corning Code 7900 glass sheet about 6″ x 3″ x ¼″ is used as a punty. A crucible was taken from the furnace at 1550° C. and one edge of the glass punty immediately dipped into the melt and a thin sheet of about $\frac{1}{32}$″ to $\frac{1}{64}$″ thickness hand drawn therefrom. Many normally dense spontaneous opal glasses, for example, Corning Code 6720 glass, produce an almost transparent sheet when drawn by this procedure. The glasses of the present invention, on the other hand, spontaneously and rapidly opacify to a dense white opal. After drawing from the melt in accordance with the foregoing procedure, the glass shapes were annealed at about 550° C.

The low melting opacifying phase of the glasses of the present invention, determined by X-ray diffraction analysis to consist principally of crystalline NaF, KF, and/or LiF, separates from the matrix glass initially in the form of droplets, as is clearly evidenced by the electron micrograph of FIG. 2, which shows a fractured surface of an opal glass article having the composition of Example 1 of Table I. The white bar at the bottom of the micrograph represents one micron. In the molten state these droplets have an index of refraction closely matching that of the matrix glass, so that glass as a whole appears clear. Upon cooling to room temperature, however, the droplets crystallize and their index of refraction changes, thus causing light scattering and rendering the glass opaque.

The essential feature of these glasses is that the melting temperature of the droplets is below the softening temperature of the matrix glass; hence, they may be clarified without risking deformation due to softening, merely by heating to the liquidus of the droplets. The low melting temperature of these droplets is presently believed to be due to the presence therein of minor amounts of $B_2O_3$, which serve as an impurity to lower the liquidus temperature thereof. The droplets generally range in diameter from about ¼ to 1 micron, and make up not more than about 30% by volume of the glass article.

Table II records various physical properties determined for certain of the glasses shown in Table I. Because of the time and expense involved in making such determinations, these properties were not measured in all instances; however, the properties of the glasses which are not shown would be substantially the same as those shown and disclosed in Table II.

TABLE II.—PHYSICAL PROPERTIES

| Example Number | 1 | 2 | 3 | 6 | 7 |
|---|---|---|---|---|---|
| Softening point, °C | 742 | 759 | 760 | 742 | 742 |
| Annealing point, °C | 560 | 541 | 541 | 560 | 560 |
| Strain point, °C | 522 | 501 | 504 | 522 | 522 |
| Thermal expansion 25–300° C. (×10⁷) | 47.5 | 44.9 | 45.0 | 47.5 | 47.5 |
| Density, gm./cc | 2.720 | 2.247 | 2.259 | 2.720 | 2.720 |
| Approximate opal liquidus, °C | 670 | 700 | 710 | 670 | 670 |

The softening point, annealing point, strain point, average thermal expansion (25–300° C.) and density for each of the glasses in Table II were determined according to conventional procedures well known in the art.

The approximate opal liquidus for each of the glasses was obtained by preparing a powder of the glass and distributing it evenly along the length of a platinum boat. The boat was then placed in a conventional gradient furnace in which the temperature ranged from about 500° C. at one end to about 1400° C. at the other, and was kept in the furnace for about 2 hours to allow the glass and boat to come to thermal equilibrium. The boat was marked with temperature graduations spaced along its length corresponding to the temperature gradient within the furnace, so that the temperature of the glass at any point along the length of the boat could be easily determined.

As previously pointed out, the opal liquidus of these glasses, i.e., that temperature at which the opacifying phase melts, corresponds to the temperature at which the glass becomes clear, since it is the melting of the opacifying phase which alters its index of refraction in the direction of the index of the matrix glass, thereby cancelling its light scattering effect. Accordingly, the opal liquidus of the glasses was quickly determined upon removal of the glass powder from the gradient furnace, by simply noting the temperature graduation at which the glass changed from opaque to clear.

In all cases, it was found that the opal liquidus of each of the glasses of the present invention was below the softening point of that glass, and it is this behavior which characterizes the glasses of the invention. Generally, the opal liquidus is found to be at least about 10° C. below the softening point for the glasses herein described, and preferably it should be at least about 20° C. below the softening point. Of course, for most applications it is desirable that the opal liquidus, and hence the clarifying temperature, be as low as possible, and therefore the glasses described in Table II, which generally have opal liquidus temperatures at least about 50° C. below their softening points, are particularly preferred.

I claim:

1. A composition for a spontaneous opal glass consisting essentially, in weight percent on the oxide basis as calculated from the batch, of 70–80% $SiO_2$, 1–3% $Al_2O_3$, 7–14% $B_2O_3$, 1.5–4% $Li_2O$, 0–10% $R_2O$, wherein $R_2O$ is at least one alkali metal oxide selected from the group consisting of $K_2O$ and $Na_2O$, 3–6% F, and a total of 1–3% of at least one opacity densifying oxide selected from the group consisting of $MoO_3$, $As_2O_3$, and $WO_3$, said glass having an opal liquidus at least about 10° C. below the softening point thereof and containing not more than a total of about 1% by weight of alkaline earth metal oxides.

2. A composition according to claim 1 which is essentially free of alkaline earth metal oxides.

References Cited

UNITED STATES PATENTS

| 2,921,860 | 1/1960 | Stookey | 106—52 |
| 3,238,085 | 3/1966 | Hayami et al. | 106—39 DV |
| 3,077,414 | 2/1963 | Wiker | 106—54 X |
| 3,275,493 | 9/1966 | MacDowell | 65—33 X |
| 3,531,303 | 9/1970 | Bahat | 106—39 DV |
| 3,428,466 | 2/1969 | Wolf et al. | 106—39 DV |
| 3,498,801 | 3/1970 | Keul | 106—39 DV |
| 3,573,074 | 3/1971 | Duke et al. | 106—39 DV |

OTHER REFERENCES

Stevels, J. M.: Glass-Ceramics, in Science of Ceramics, New York, 1965, p. 426.

McMillan, P. W.: Glass-Ceramics, London, 1964, pp. 71–73.

JAMES E. POER, Primary Examiner

W. R. SATTERFIELD, Assistant Examiner

U.S. Cl. X.R.

65—33; 106—39 DV